Jan. 1, 1929.
F. H. CHANDLER
1,697,754
TOASTING OR COOKING APPARATUS
Filed May 15, 1925    2 Sheets-Sheet 1
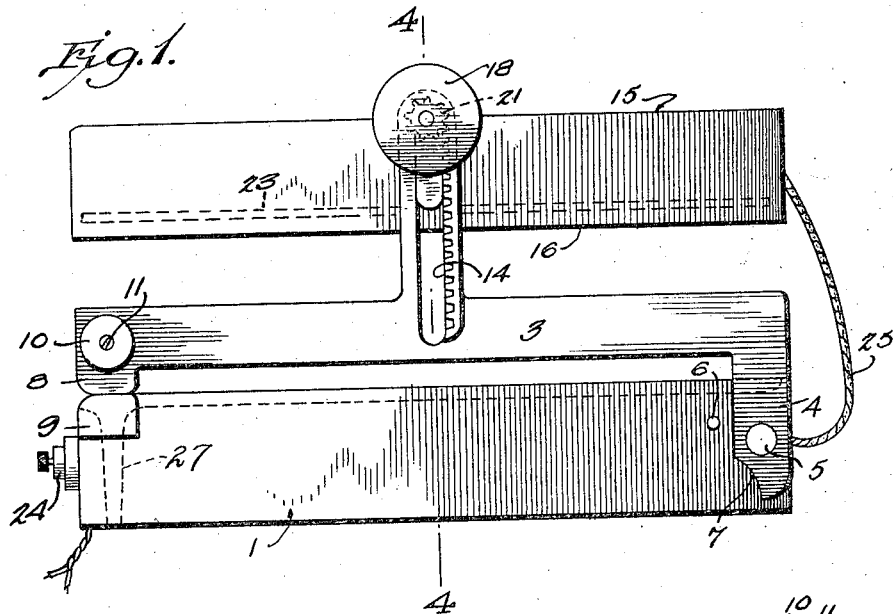
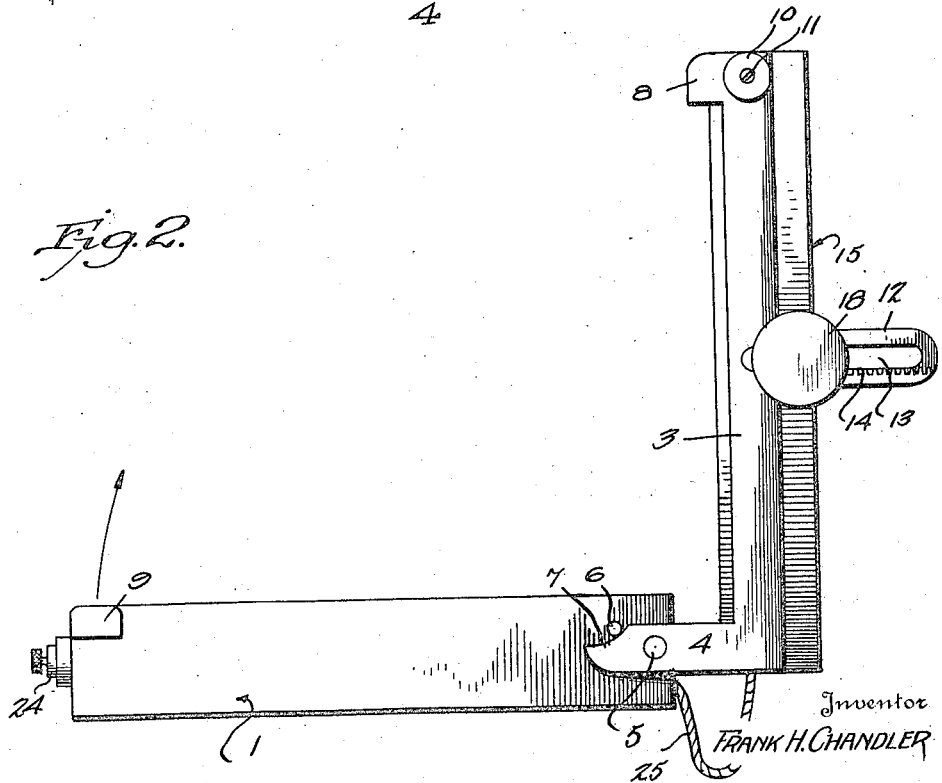
Inventor
FRANK H. CHANDLER
By
Attorney Jan. 1, 1929.
F. H. CHANDLER
1,697,754
TOASTING OR COOKING APPARATUS
Filed May 15, 1925  2 Sheets-Sheet 2
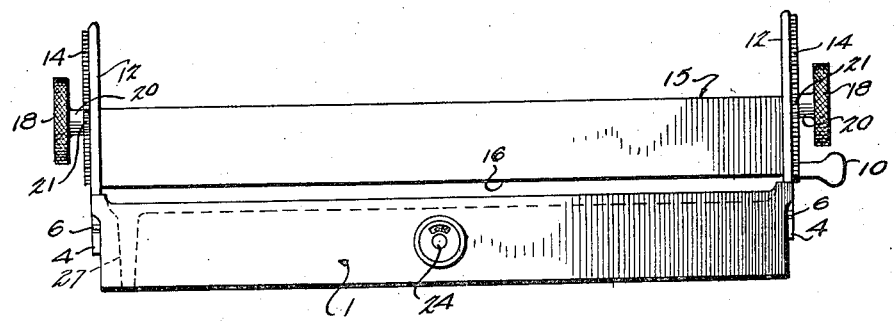
Inventor
FRANK H. CHANDLER
Attorney Patented Jan. 1, 1929.

1,697,754

UNITED STATES PATENT OFFICE.

FRANK H. CHANDLER, OF DANVILLE, ILLINOIS, ASSIGNOR TO C. V. CHAMPION & COMPANY, OF DANVILLE, ILLINOIS, A CORPORATION OF ILLINOIS.

TOASTING OR COOKING APPARATUS.

Application filed May 15, 1925. Serial No. 30,574.

This invention relates to toasting or cooking apparatus, and more particularly to a device having upper and lower plates or heating surfaces for toasting or cooking an article on both sides at the same time.

An object of the invention is the provision of a device of the above mentioned character in which the heating plates are adjustable with respect to each other, whereby the distance between the heating surfaces may be regulated to permit the machine to be used for toasting slices of bread, prepared sandwiches, or other food products of varying thickness.

A further object of the invention is the provision of means for retaining the plates or cooking surfaces parallel to each other at all times.

In the accompanying drawings, I have shown one embodiment of the invention. In this showing:

Figure 1 is a side elevation with the upper and lower cooking plates spaced from each other, Figure 2 is a similar view showing the upper cooking plate in lowered position and showing the parts in opened position, Figure 3 is a front elevation showing the upper plate in lowered position, Figure 4 is a transverse vertical sectional view substantially on line 4—4 of Figure 1 but showing the upper plate in lowered position, Figure 5 is a detail sectional view substantially on line 5—5 of Figure 4, and, Figure 6 is a detail perspective view of one end of the shaft employed for adjusting the upper cooking plate.

Referring to the drawings, the reference numeral 1 designates generally the lower cooking plate which is adapted to rest upon a suitable support and is provided with a heating surface 2. The upper cooking plate is supported in a pair of side frames 3 which are hingedly connected to the lower plate. As shown, each of the side frames is provided with a depending portion 4 at its rear end, adapted to receive a pin 5 which is mounted in the side wall of the lower cooking plate. A stop pin 6 is also arranged in this side wall and the depending arm 4 extends beyond the hinge pin and is provided with a curved surface 7 adapted to engage this pin to limit the upward movement of the frame and the upper plate (see Figure 2). Each of the side frames is provided with a depending member 8 at its forward or free end adapted to engage a support or rest 9, carried by the lower plate when the frame is in its normal position (see Figure 1). The frame is also provided with knobs or handles 10 at its forward end which are mounted on studs or pins 11 to permit the frame to be raised when desired. Each of the arms 3 is provided with an upwardly extending guide member 12 having an elongated slot 13 formed therein. Adjacent one side of the slot, there is provided a rack 14.

The upper plate consists of a substantially box-like member 15 having a cooking plate or surface 16 arranged on its lower face and disposed over the cooking surface 2 of the lower plate. A rod or shaft 17 is mounted in the upper plate and the ends of this shaft project through the slots 13 of the guides. An operating handle 18 is secured to the end of the shaft by means of a key 19 and this handle is provided with a hub 20 having a pinion 21 formed thereon and adapted to mesh with the rack 14. The shaft also carries a guide block 22 adapted to be received in the slot to prevent the upper plate from tipping.

Any suitable means may be employed for heating the plates. As shown, electric heating elements 23 may be arranged adjacent the heating surfaces 1 and 16 and controlled by a suitable switch 24 mounted on the front of the device. The heating element in the upper plate is connected to the heating element in the lower plate by means of a lead wire 25, which is of sufficient length to bridge the space between the plates when at their maximum distance from each other (see Figure 1).

The lower plate is provided with a flange 26, forming a grease retainer, and is further provided with a conduit 27, forming a grease drain to carry off excess grease from the cooking surface.

The operation of the device will be apparent from the foregoing description. When toasting slices of bread or other thin articles of food, the plates are arranged adjacent each other, as shown in Figures 3 and 4. When toasting a prepared sandwich or other food article of appreciable thickness, the distance between the plates is so that the plates will contact with the upper and lower surfaces of the article to be toasted or cooked, thus permitting the two sides to be toasted or cooked at the same time. The device may be readily adjusted by turning either of the knobs 18.

As stated, the guide blocks 22 retain the upper plate in a position parallel to the lower plate and prevent it from swinging on the shaft 17 as a pivot. The apparatus may be opened in the usual manner for removing the toasted or cooked article by grasping one of the knobs 10 and swinging the upper frame to the position shown in Figure 2 of the drawings.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a lower cooking plate, a pair of bars hingedly mounted on said lower plate and forming a frame, vertical guides carried by said frame, said guides being provided with elongated slots, a rack formed on each of said guides adjacent said slot, a shaft extending through said slots, pinions mounted on said shaft and meshing with said racks, and an upper cooking plate carried by said shaft.

2. In a device of the character described, a lower cooking plate, a pair of bars hingedly mounted on said lower plate and forming a frame, vertical guides carried by said frame, said guides being provided with elongated slots, a rack formed on each of said guides adjacent said slot, a shaft extending through said slots, pinions mounted on said shaft and meshing with said racks, an upper cooking plate carried by said shaft, and guide blocks carried by said plate and received in said slots.

3. A device of the character described comprising a pair of superimposed cooking plates, one of said plates being supported for movement relative to the other of said plates, and mechanical means for vertically adjusting said first named plate, one of said superimposed plates being arranged to swing away from the other of said plates to permit the insertion of articles to be cooked.

4. A device of the character described comprising a pair of superimposed cooking plates, one of said plates being supported for vertical movement relative to the other of said plates, and movable mechanical means for vertically adjusting said first named plate, the upper of said plates being adapted to swing away from the lower of said plates to permit the insertion of articles to be cooked.

5. A device of the character described comprising a pair of superimposed cooking plates relatively movable vertically with respect to each other, movable supporting means for one of said plates, and means for providing vertical adjustment of said plates with respect to each other, one of said plates being arranged to swing away from the other of said plates to permit the insertion of articles to be cooked.

6. A device of the character described comprising a lower cooking plate, a frame hingedly mounted thereon, an upper cooking plate carried by said frame, movable mechanical means for adjusting said upper cooking plate vertically in said frame, and means for swinging said upper cooking plate away from said lower cooking plate to permit the insertion of articles to be cooked.

7. A device of the character described comprising a lower cooking plate, a pair of bars hingedly mounted on said lower plate and forming a frame, vertical guides carried by said frame, an upper cooking plate mounted in said guides, and movable mechanical means for vertically adjusting said upper plate.

8. A device of the character described comprising a lower cooking plate, a heating element arranged therein, a pair of bars hingedly mounted on said lower plate and forming a frame, vertical guides carried by said frame, a shaft mounted in said guides and capable of vertical adjustment, an upper cooking plate carried by said shaft, and a heating element arranged in said upper cooking plate, said upper cooking plate being adapted to swing away from said lower cooking plate to permit the insertion of articles to be cooked.

In testimony whereof, I affix my signature.

FRANK H. CHANDLER.